Patented Oct. 23, 1945

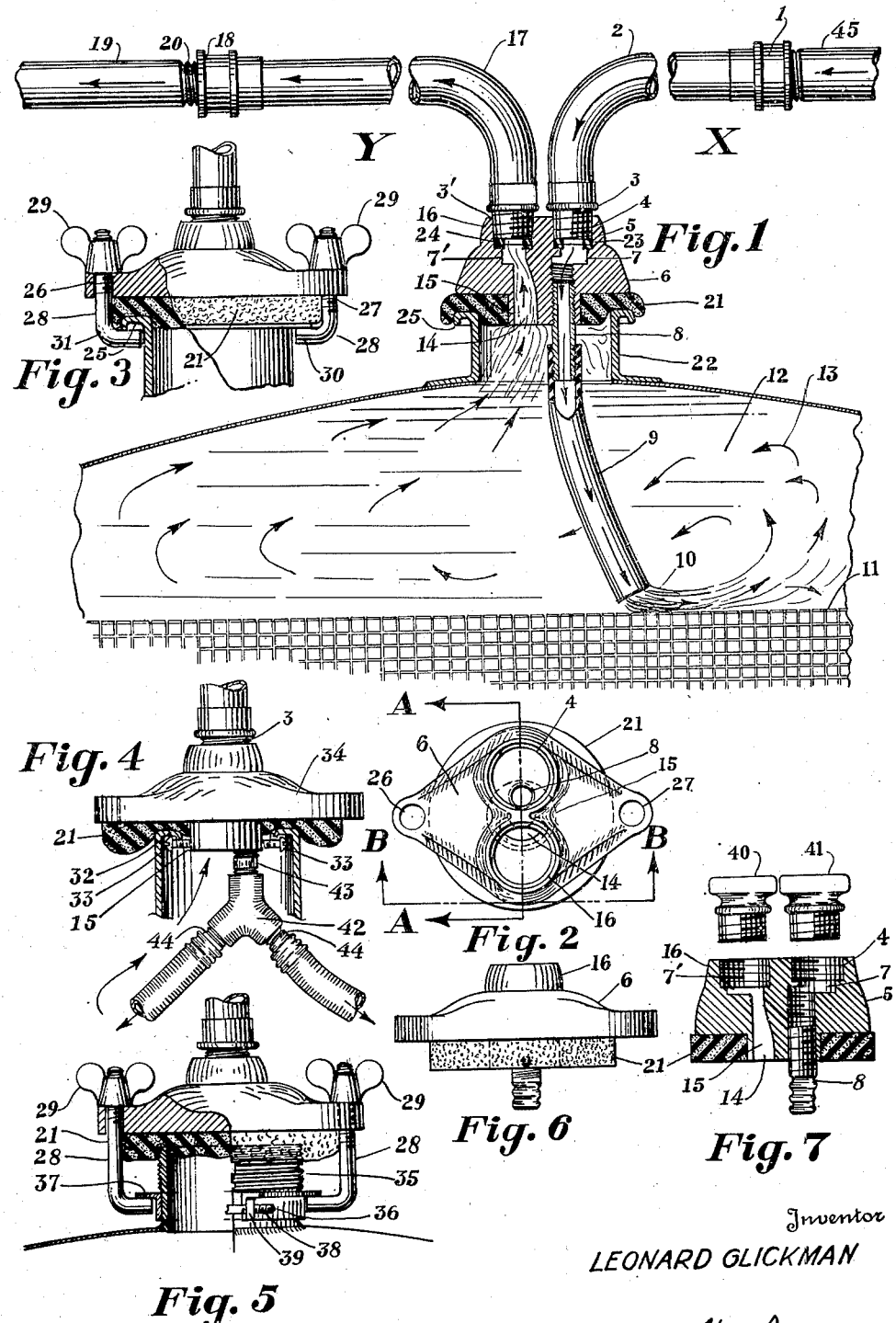

2,387,324

UNITED STATES PATENT OFFICE 2,387,324

METHOD OF AND DEVICE FOR CLEANING AUTO RADIATORS

Leonard Glickman, Miami Beach, Fla.

Application December 30, 1941, Serial No. 424,976

15 Claims. (Cl. 134—22)

This invention relates to the cleaning art. More particularly it pertains to means adapted for the fluid cleaning of an inclosure wherein there is a tendency for sedimentation to accumulate, and embraces within its scope novelty of apparatus and method of operation. While the invention is clearly of broad application, a primary embodiment thereof pertains to a device or attachment for cleaning the cooling system of an engine, such as the automotive type. To facilitate a consideration of the invention, the following description, which is illustrative in scope, will be directed to the aforesaid preferred embodiment.

In the usual practice attendant removing accumulated sedimentation from an automobile cooling system, no device has been heretofore available which has afforded a simplified method of expediently cleaning the radiator with a minimum of effort, and inconvenience during the comparatively brief time interval usually taken for refueling and/or checking the tire pressure of an automobile.

One method for flushing accumulated sedimentation from an automobile radiator, which is at present frequently resorted to, depends upon draining the radiator water through the petcock while additional water is supplied through the radiator opening or inlet. In view of the inconvenience attendant the opening and closing of the petcock and the tendency to overflow onto the hood and radiator, thereby affecting the polished appearance, the intervals for such flushing are comparatively rare and the general cleaning effect is conceded to be inefficient. For more effective cleaning, the hose connections extending between the radiator and the cooling jacket of the engine are detached, and a reverse water flush is resorted to from the lower portion of the radiator upwardly, and out through the radiator opening or inlet; this procedure is in the category of a time consuming service job, necessitating considerable dismantling and reconnecting of parts.

It is an object of my invention to obviate such difficulties and uncertainties as hereinabove referred to.

An additional object is to provide a device of simple, sturdy construction adapted to facilitate the rapid and efficient removal of sedimentation from an enclosure by expedient washing.

Another object is to attain a device for attachment to the water supply inlet or opening of an automobile radiator through which the cooling system may be effectively washed without resort to draining or dismantling of parts.

Another object is to present a device for effectively removing the sedimentation from an automobile radiator by washing therethrough, said device being adapted for either temporary or permanent attachment to the water supply inlet of the radiator.

A further object is to obtain an automobile radiator cap which is adapted to function as a washing device for removing undesirable accumulations in the radiator and/or cooling system of an engine.

An important object is to devise a practical, expedient method of cleaning out sedimentation from an automobile or similar cooling system, and especially the radiator portion thereof.

Other objects, advantages and features of my invention will become apparent from the following description to be read in connection with the accompanying drawing in which similar elements are designated by like numerals:

Fig. 1 is drawn to indicate a cleaning installation or system with the washing device, shown in section taken along line A—A of Fig. 2, attached to the supply opening or inlet of an automobile radiator, the latter presented in fragmentary portion.

Fig. 2 is a plan view of the device.

Fig. 3 provides a side elevation shown partly in section and viewed in the direction of line B—B of Fig. 2, indicating a locking attachment for a radiator inlet of the outwardly extending flange type.

Fig. 4 relates to a side elevation partly in section, viewed similarly to Fig. 3, showing a modified form of attachment locking means adapted for the inner flange type radiator inlet; this figure also shows a modified form of water supply tubing internally of the radiator.

Fig. 5 is a similar, partly sectional side view, revealing an alternative locking association of the cleaner device with an externally threaded type radiator inlet.

Fig. 6 presents a side elevation of the washing device per se, viewed from B—B.

Fig. 7 is a sectional view of the cleaning device taken along A—A of Fig. 2, with plugs indicated to adapt it for use as a radiator cap.

It has been ascertained, within the purview of my invention, that in the water cooling circulatory system of an engine, there is a tendency for the sedimentation of extraneous matter to accumulate in the head compartment of the radiator above the header from which the radiator tubes extend. Without intending to be restricted to any theory of operation, it is believed that this tendency may be attributable to the function of the water pump, drawing water from the lower portion of the radiator and returning it to the head compartment; in the course of the water circulation, the extraneous particles are drawn downwardly into the tubes of the radiator core, ultimately obstructing them.

In accordance with the present invention, by resort to an appropriate washing of the head compartment of the radiator, with the washing medium supplied and withdrawn through the radiator inlet, an effective cleaning of the radiator and cooling system generally is attainable. Such appropriate washing is accomplished through the use of the cleaning device of the present invention which lends itself to a facilitated usage, and hence comparative frequency of radiator cleaning, thereby minimizing any tendency of the radiator core tubes to become obstructed.

Referring more particularly to the preferred adaptation of the invention as presented by the embodiments shown on the drawing, the numeral 1 designates the female portion of a hose fitting associated with the threaded end of water supply line 45, and with a conduit 2 which may conveniently be of any suitable flexible material, such as flexible metal or rubber. The opposing extremity of conduit or hose 2 is provided with a male hose fitting 3 threaded at its end for association with internally threaded boss 4, determining the inlet means, integral with the head portion 5 of the body of cleaner device 6. The source of water supply not shown may conveniently comprise a permanent installation broadly designated as X, which may include conduit 45, and if desired hose 2.

The passage determined by boss 4 is connected with a comparatively restricted passage 7 through the device and with which a nipple connection 8, comprising an inlet conduit of comparatively restricted diameter relative to the inlet means of boss 4, is associated. It will be noted that while nipple 8 in combination with passage 7 and boss 4 provides a through passage, the nipple is desirably offset relative to the boss opening in order to afford a turbulent or swirling velocity buildup as between the hose or pipe 2 and nipple 8, and a resultant turbulence increase in radiator head 12. As shown in Figs. 1 and 7, the conduit of nipple 8 extends in substantially the same direction as the passage determined by boss 4 and is in partial alignment therewith.

Attached to the lower portion of nipple 8 may be any desirable type of tubing 9 desirably flexible, such as rubber, which functions as the radiator filler pipe. Tube 9 may preferably be disposed within the radiator head 12 in a manner to have its opening 10 directed toward the outside portion of the header 11, in order to afford a desirable directional circulation to the water being supplied. The directional movement of water in the radiator head 12 is indicated by the arrows 13, although it is not intended to be restricted to any particular theory as to the direction of fluid flow. The outflow circuit of the water from the radiator through the cleaner device comprises the duct 14, passage 7¹ and boss 16.

The duct 14, which is in the collar portion 15 of the device 6, may be of arcuate section as shown in Fig. 2, and desirably adapted to accommodate the flow of water supplied by filler tube 9. Thus duct 14 desirably provides for a greater volume carriage than flows through nipple 8 or tube 9.

It will be noted from Fig. 1 that the said duct 14 comprises a restricted outlet conduit, and as it extends through collar 15, may desirably be gradually restricted in its approach to passage 7¹, which functions as the area of transition to the comparatively enlarged diameter of outlet boss 16, determining the outlet means of the body portion of the cleaner device 6.

Attached to internally threaded boss 16 is the male hose fitting 3¹ forming the externally threaded terminus for pipe or hose 17, desirably of flexible material such as rubber. The other end of hose 17 is supplied with a female connection 18 internally threaded for attachment to the threaded end 20 of pipe conduit 19 leading to a point of disposal not shown on the drawing. If desired, a permanent disposal system may be utilized, broadly designated by Y, including conduit 19, and if desired hose 17.

The material of which the various parts are fabricated has no critical bearing on the invention and will doubtless be determined from expediency and preference in view of the use to which the device is to be applied. Merely by way of illustration, the cleaner device may desirably be supplied with a sponge rubber base portion 21 which is in any expedient manner affixed to the bottom of cleaner device 6, and serves as an effective gasket to attain a watertight association with the radiator opening or inlet 22, as evidenced in Fig. 1 and the sectional portions of Figs. 3, 4 and 5 by the compressed fit of 21 against the inlet edges. The body portion 5, as well as the internally threaded bosses 4 and 16, and passages 7, 7¹ and 14 are desirably formed from a unitary metal casting, although this may be subject to variation.

Within the bosses 4 and 16 may be positioned rubber gaskets 23 and 24 to provide an appropriate water-tight fit when threaded male pipe connections 3 and 3¹ of hose or pipe 2 and 17 respectively are fitted into their appropriate positions for connection with head or body portion 5.

As illustrative dimensions of an embodiment of the invention, the pipe 19 may be about ¾" diameter and of galvanized metal. The outside diameter of collar 15 for average use may be approximately 1$\tfrac{1}{16}$". An approximate minimum dimension of the base portion of the cleaner device, corresponding with sponge rubber gasket 21, to fit the radiator opening of virtually any new type car, may conveniently be about 3", or perhaps somewhat larger. Bosses 4 and 16, into which the male portions 3 and 3¹ of the hose connections are attached may desirably be tapped to correspond with ¼" to ⅜", ½" or ¾" diameter and of standard pipe thread, whereas the diameter of passage 8 has effectively been utilized between ⅜" to ⅝". Duct 14 may vary from approximately ⅜" at the bottom portion thereof to approximately ⅝" at the section adjacent to boss 16. The diameter of hose 17 as well as hose 2 may be substantially similar to that of conduit 19.

For effective clamping of the cleaner device in position relative to radiator inlet 22, various structures may be relied upon. Where the radiator opening is provided with an outwardly extending flange portion, as at 25, for attachment of the radiator cap not shown, the clamping modification of Fig. 3 has been found effective. In this arrangement, the cleaner device 6 is provided with openings 26 and 27 at opposed ends thereof, through which angle bolts 28 may project in locking association with respect to flange portions 25. One end of angle bolts 28 is externally threaded for receiving internally threaded winged nuts 29. It will thus be seen that by merely tightening up the said wing nuts, portion 30 of angle bolts 28 will be brought into locking engagement with the downwardly projecting edge 31 of flange 25. This locking association will serve to compress sponge rubber gasket 21 between the base of cleaner device 6 and flange 25, as shown in Figs. 1 and 3, to render the assembly fluid tight.

Where the radiator inlet 22 is designed with internally directed opposed peripheral flanges 32, as in Fig. 4, the collar portion 15 of the cleaner device may be aptly provided with screws or the like 33 oppositely positioned and projecting outwardly from the collar surface. When the cleaner 6 is to be attached to the radiator inlet, it is merely rotated in order to have the screw heads 33 positioned beneath the downwardly directed edge 34 of the flanges 32, simultaneously compressing gasket 21 between the base of the device and flanges 32.

Where the radiator opening is of the old type having its outer peripheral surface threaded, as shown at 35 of Fig. 5, for receipt of an internally threaded radiator cap not shown, a ring clamp 36 having an outwardly directed flange portion 37 may be conveniently resorted to. It will be seen that this ring hose clamp 36 may have its adjacent ends tightly locked together by utilization of a threaded screw 38 and complementary nut 39. As in the case of Fig. 3, angle bolts 28 provided with wing nuts 29, may be utilized for obtaining the locking association between the cleaner body and radiator opening or inlet. In this modification, the sponge rubber disc 21 is clamped between the inlet edge and the base portion of device 6, thereby affording a fluid tight closure.

In all of the modifications shown, the sponge rubber disc or gasket 21 is desirably of substantial thickness, desirably approximately ½". By resorting to such thickness, not only an effective sealing is attained, but the gasket functions in lieu of a spring device for permitting the cleaner body to be effectively locked with respect to the peripheral edge of the radiator inlet or to the flanges provided either integrally with said inlet, or as part of the ring clamp of Fig. 5.

The side view of Fig. 6 as well as the sectional indication of Fig. 7 provide an overall showing of the structure of the cleaner device 6 which is applicable to any of the figures of the drawing previously discussed. It will be seen from Figs. 6 and 7, especially the latter, that the device may be designed to function as the radiator cap per se. Illustratively this modification of the invention may be attained by providing bosses 4 and 16 of Fig. 7 with appropriate externally threaded closure plugs 40 and 41. When it becomes desirable to utilize the cap as a cleaning means, it is merely necessary to remove these plugs and apply the appropriate hose connections.

In Fig. 4a modification of radiator filler tube is shown in the form of a Y fitting 42 attached to nipple tube 43. To the appropriate ends of the Y fitting, angularly disposed or flexed tube connections 44, desirably of flexible fabrication such as rubber, may be attached in a manner to direct the water supply toward the outer portion of the radiator head 12, as indicated by the arrows shown in this figure. By the arrangement shown, a dual or plural directional flow of water supply may be provided, and by aptly directing the respective tubes, a cumulative directional flow may be obtained to afford an accelerated cleaning action. In this connection, it should be noted that within reasonable limits under given conditions, an increase in the pressure of the water supply will shorten the required cleaning time.

In the utilization of my device, its operation may be as follows: Referring to Fig. 1, with the cleaning device 6 locked in position, water is supplied through installation X including hose 2; thence the water will course through the inlet side of the cleaning device comprising boss 4, transition passage 7, the comparatively restricted passage through nipple 8, and thence into head portion 12 of the radiator. By the restricted flow operating in conjunction with the outward directional effect, an optimum extent of agitation or turbulent action is provided. The outward flow of the water, containing the extraneous matter in suspension, is through duct 14 of gradually increasing restrictive cross section, followed by the comparatively enlarged passage 7¹, boss 16, hose 17, and through conduit 19 to the disposal system Y. As will be apparent from Fig. 2, the cross section of duct 14 at its most restricted point is desirably in excess of the restricted cross section of nipple 8. It will thus be seen that the restricted outflow contributes to the turbulent effect for optimum conditions of operation, resulting in efficient suspension and removal of extraneous matter.

By providing supply system X and disposal system Y of a substantially permanent nature, it will be seen that the attachment device may be utilized at any time an automobile is present at a service station for refueling or the like, thereby obviating any tendency toward the usual radiator core obstruction. Without the inconvenience necessitated by manipulating the petcock at the lower portion of the radiator, or dismantling and reconnecting any parts, the service station attendant may regularly and in a comparatively brief time interval, apply a cleaning flow through the radiator. Thus the device lends itself to frequent washing of the radiator to keep it free from sediment accumulations with no more effort than is usually required to refuel or supply the radiator with water. Even where a radiator has not been subject to comparatively frequent washings, the device will operate to provide an effective cleaning, although the necessary time interval will be greater. In general, the time required for any radiator cleaning in accordance with the present invention, will be less with increased pressure conditions of the washing treatment.

It will thus be seen that the device forming the basis of the invention provides an expeditious means and method for effectively cleaning and for maintaining substantially free from sediment accumulations, the cooling system of an automobile. The device is of simplified, yet sturdy construction, and substantially obviates the inconvenience and difficulty attendant the prior art devices and procedures. The attachment may be either permanently applied, as in the radiator compartment above the header 11, or utilized only when the cleaning treatment is actually contemplated. Moreover, as described herein, it may assume the form of a radiator cap.

While I have described my invention in accordance with desirable embodiments, it is obvious that many changes and modifications may be made in the details of construction and in the combination and arrangement of parts, as well as in the procedure of operation, without departing from the spirit of the invention as defined in the following claims.

I claim:

1. In a cleaner device, a body portion comprising an inlet means, a connecting conduit of substantially restricted cross section relative to said inlet means and in continuation thereof, said connecting conduit extending through said body portion, an outlet means, and a conduit connected therewith and extending through said body portion, said inlet and outlet means being disposed at the same end of said body portion.

2. In a cleaning device, a body portion comprising an inlet means, a connecting conduit of substantially restricted cross section relative to said inlet means and in continuation thereof, said connecting conduit extending through said body portion, an outlet means, and a restricted conduit connected therewith and extending through said body portion, said outlet restricted conduit being of greater cross sectional area than said inlet restricted conduit, said inlet and outlet means being disposed at the same end of said body portion.

3. A device for cleaning an enclosure which comprises a body portion, an inlet means and an outlet means for said body portion, a conduit through said body portion in communication with said inlet means and offset relative thereto, said conduit extending in substantially the same direction as said inlet means, and an outlet conduit through said body portion in communication with said outlet means, said inlet and outlet means being disposed at the same end of said body portion.

4. A device for cleaning an enclosure which comprises a body portion, an inlet means for said body portion, a conduit through said body portion in communication with said inlet means and offset relative thereto, said conduit extending in substantially the same direction as said inlet means, and an outlet conduit through said body portion.

5. A device for cleaning an enclosure which comprises a body portion, an inlet means and an outlet means in said body portion, a comparatively restricted conduit in communication with said inlet means and extending through said body portion, said conduit being in offset alignment relative to said inlet means and extending in substantially the same direction, and an outlet conduit through said body portion in communication with said outlet means.

6. A device for cleaning an enclosure which comprises a body portion, an inlet means and an outlet means in said body portion, a comparatively restricted conduit in communication with said inlet means and extending through said body portion to the end thereof opposite said inlet means, said conduit being offset relative to said inlet means and extending in substantially the same direction, a restricted outlet conduit of a cross sectional area greater than said inlet conduit and extending through said body portion into communication with said outlet means.

7. In a radiator cleaner combination, an attachment adapted to be locked in position relative to the water supply inlet of the radiator, said attachment providing an inlet conduit, a conduit in continuation of said inlet conduit and restricted relative thereto, said conduit extending through and beyond said attachment, an outlet conduit in the same portion of said attachment as said inlet conduit and a conduit in continuation thereof extending through said attachment, means for supplying fluid through said inlet conduit and corresponding restricted conduit in extension thereof, and means for conducting fluid from said outlet conduit.

8. The combination as in claim 7 wherein a conduit means is attached to said restricted conduit for imparting an outwardly directional flow of fluid within the radiator head.

9. The combination as in claim 7, wherein the attachment comprises a cap for the radiator inlet, said cap being provided with a rubber gasket at its base surface for contacting the radiator inlet in a water-tight fit.

10. In a radiator cleaner combination, an inlet hose connection, a body portion, an inlet conduit at the top of said body portion, said inlet hose and conduit being adapted for detachable connection, means defining a passage through said body portion of restricted cross-section relative to said hose and inlet conduit, an outwardly flexed conduit attached to said restricted passage defining means for imparting directional flow to the fluid passing through said conduits, and an outlet passage through said body portion connecting with an outlet conduit at the top of said body portion.

11. In a radiator cleaner combination, an attachment adapted to be locked in position relative to the water supply inlet of the radiator, said attachment providing a first and a second conduit, a plurality of conduits attached to said first conduit and adapted for imparting outwardly directional flow to the fluid within the radiator, means for supplying fluid through said first conduit and said plurality of conduits attached thereto, and means for conducting fluid from said second conduit adapted to remove fluid from said radiator interior.

12. In a radiator cleaner combination, an attachment adapted to be locked in position relative to the water supply inlet of the radiator head, said attachment comprising a body portion having an inlet and an outlet, a first and a second conduit in said body portion extending through the same at the end opposite said inlet and outlet, said first conduit being in communication with said body portion inlet and restricted relative thereto, said second conduit being in communication with said outlet, a plurality of conduits in angularly disposed attachment to said first restricted conduit and adapted for providing outwardly directional streams of fluid within the radiator head, means for supplying fluid through said body portion inlet, restricted conduit and the conduits attached to said restricted conduit, and means for conducting fluid from said body portion outlet.

13. A method of cleaning an automobile radiator which comprises flowing water into the inlet thereof through a first restricted passage, directing the flow of water from the restricted passage into the radiator head in at least one stream angularly disposed relative to said first restricted passage, and passing the water outwardly from said radiator head through a second restricted passage extending through said radiator inlet.

14. The method of cleaning an automobile radiator which comprises flowing water into the inlet thereof through a restricted passage, directing the flow of water from the restricted passage into the radiator head in a plurality of angularly disposed streams, and passing the water outwardly from said radiator head through said inlet.

15. A method of cleaning an automobile radiator which comprises flowing water into the inlet thereof through a first restricted passage, directing the flow of water from said first passage into the radiator head in a plurality of streams angularly disposed relative to said first restricted passage, and passing the water outwardly from said radiator head through a second restricted passage extending through said radiator inlet, said second restricted passage being of greater cross-sectional area than said first restricted passage.

LEONARD GLICKMAN.